Aug. 31, 1954 D. H. STODDARD 2,687,894
FOLDABLE GOLF BAG CART
Filed March 17, 1953 3 Sheets-Sheet 1
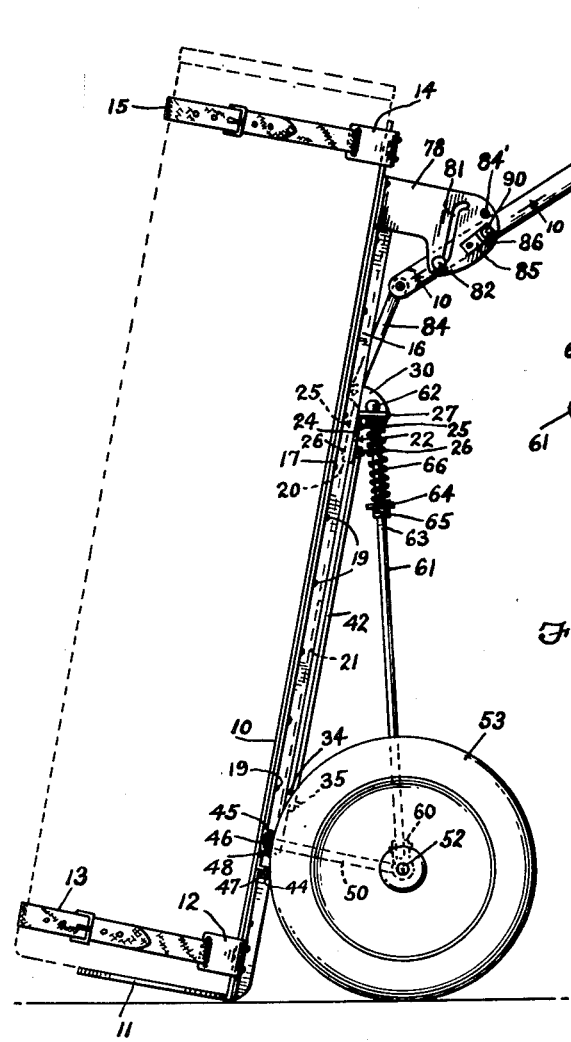
Fig. 1.
Fig. 5.
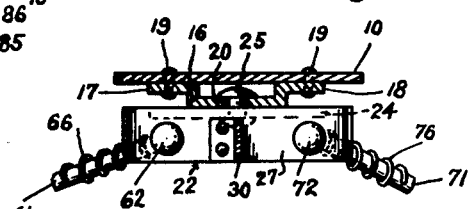
Fig. 6.
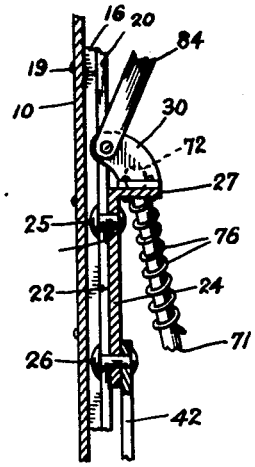
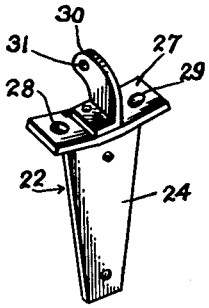
Fig. 8.
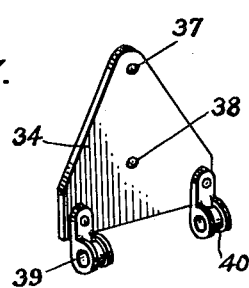
Fig. 7.
INVENTOR.
Duncan H. Stoddard
BY
McMorrow, Berman + Davidson
Attorneys.

Aug. 31, 1954     D. H. STODDARD     2,687,894
FOLDABLE GOLF BAG CART
Filed March 17, 1953     3 Sheets-Sheet 2
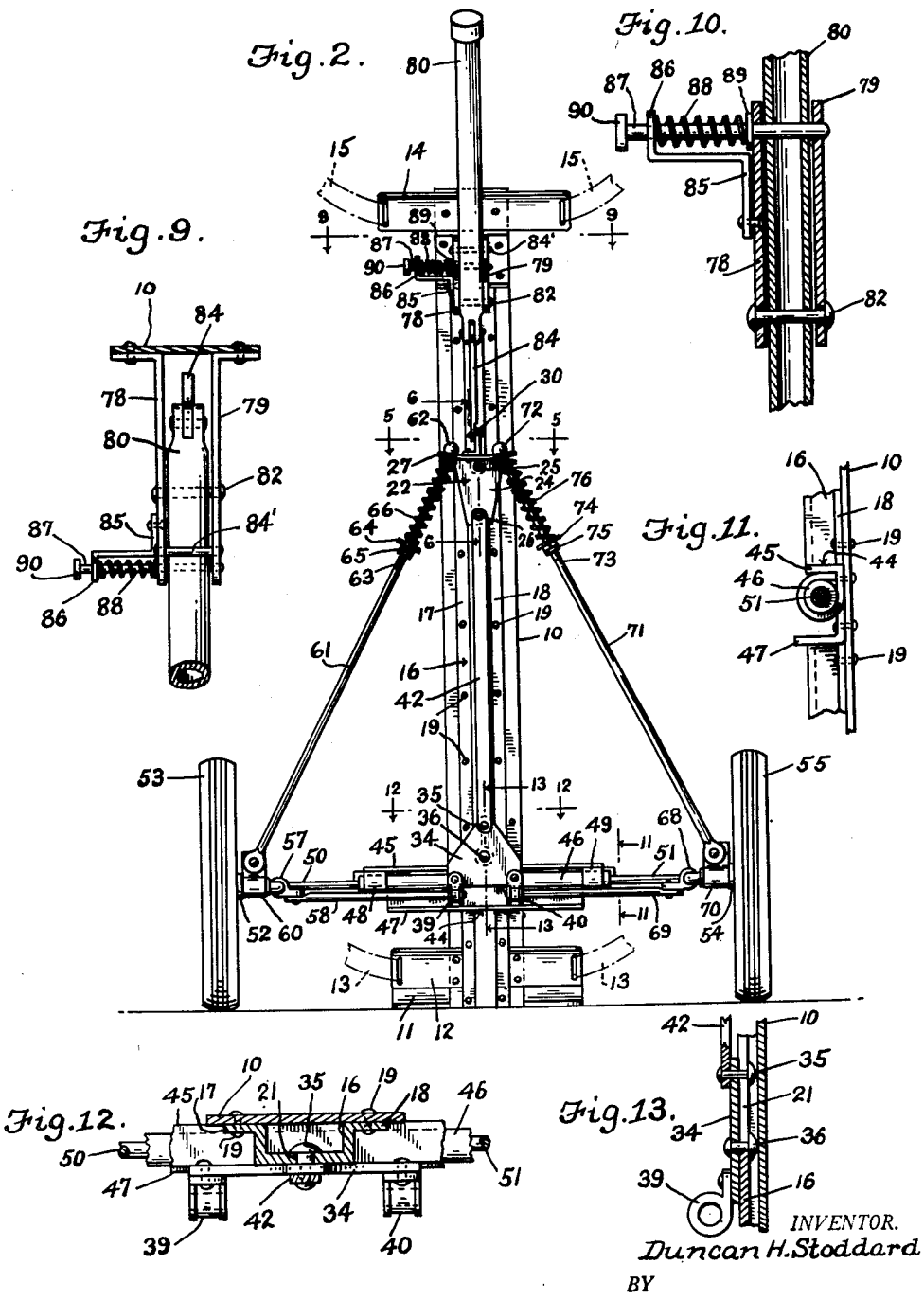
INVENTOR.
Duncan H. Stoddard
BY
McMorrow, Berman & Davidson
Attorneys.

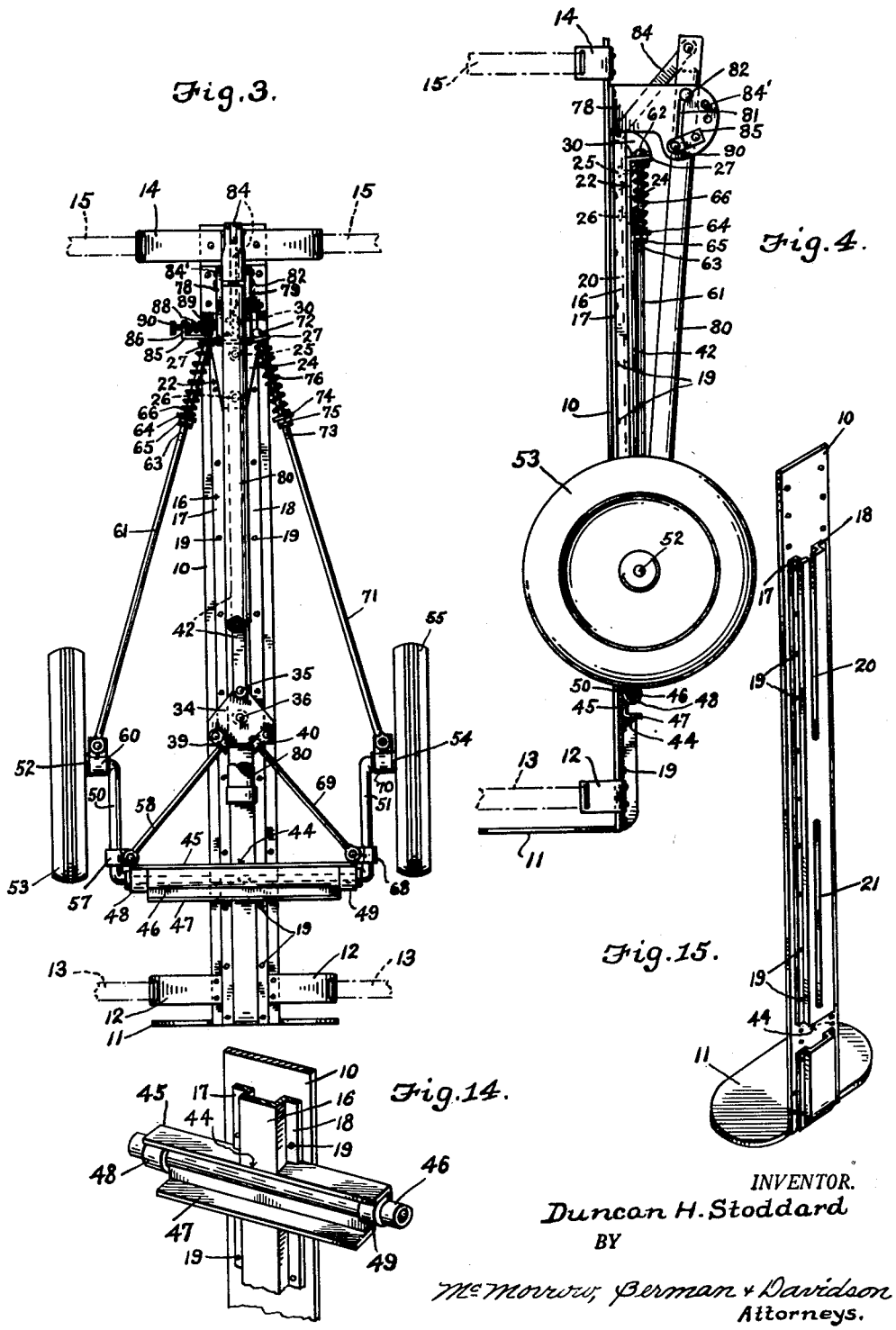

Patented Aug. 31, 1954

2,687,894

UNITED STATES PATENT OFFICE 2,687,894

FOLDABLE GOLF BAG CART

Duncan H. Stoddard, Oklahoma City, Okla.

Application March 17, 1953, Serial No. 342,811

3 Claims. (Cl. 280—41)

This invention relates to foldable golf bag carts and more particularly to a foldable golf bag cart in which the cart handle is used as a lever for folding and unfolding the cart.

It is among the objects of the invention to provide an improved folding golf bag cart which can be quickly and easily changed between its expanded or operative condition and its folded condition by movement of the cart handle about a pivotal axis on the cart frame; which simultaneously reduces the space between the cart wheels and between the wheels and the frame when the cart is folded; which includes a spring suspension between the frame and the wheels; which is free of any tendency to stick or jamb while being folded or unfolded; which folds to a condition of substantially maximum compactness for transportation and storage and has a high degree of stability when unfolded for use; and which is of simple, durable and light weight construction, economical to manufacture, and neat and attractive in appearance.

Other objects and advantages will become apparent from a consideration of the following description and the appended claims in conjunction with the accompanying drawings, wherein:

Figure 1 is a side elevational view of a golf bag cart illustrative of the invention;

Figure 2 is a rear elevational view of the cart in unfolded or operative condition;

Figure 3 is a rear elevational view of the cart in folded condition;

Figure 4 is a side elevational view of the cart in folded condition;

Figure 5 is a transverse cross sectional view on an enlarged scale on the line 5—5 of Figure 2;

Figure 6 is a fragmentary longitudinal cross sectional view on an enlarged scale on the line 6—6 of Figure 2;

Figure 7 is a perspective view of a slide forming an operative component of the invention;

Figure 8 is a perspective of a second slide also constituting an operative component of the device;

Figure 9 is a transverse cross sectional view on an enlarged scale on the line 9—9 of Figure 2;

Figure 10 is a fragmentary cross sectional view on an enlarged scale on the line 10—10 of Figure 1;

Figure 11 is a fragmentary cross sectional view on an enlarged scale on the line 11—11 of Figure 2;

Figure 12 is a fragmentary cross sectional view on an enlarged scale on the line 12—12 of Figure 2;

Figure 13 is a fragmentary cross sectional view on an enlarged scale on the line 13—13 of Figure 2;

Figure 14 is a fragmentary perspective view of a portion of the cart frame; and

Figure 15 is a perspective view of the frame structure of the cart, with a portion omitted for the purpose of simplifying the illustration.

With continued reference to the drawings, the cart comprises a frame plate 10 of elongated, rectangular shape having a platform structure 11 extending perpendicularly from one end thereof to receive a golf bag, a bottom strap hanger 12 extending across the plate and projecting from respectively opposite sides thereof near the platform 11 for receiving the ends of a bag-securing strap 13 and an upper strap hanger 14 extending transversely across the plate near the end thereof remote from the platform structure 11 and projecting from the respectively opposite sides of the plate to receive the upper, bag-securing strap 15.

A track or guideway 16 is mounted on the rear side of the frame plate 10 and extends longitudinally of the plate. This guideway comprises a member of channel-shaped cross section disposed with its open side against the rear surface of the plate 10 and having outwardly projecting, lateral flanges 17 and 18 extending one along each longitudinal edge thereof and secured to the plate 10 by suitable means, such as the rivets 19. The member 16 is provided medially of the width of the web portion thereof with longitudinally extending slots 20 and 21 disposed in end to end and spaced apart relationship to each other.

A first slide 22 is slidably mounted on the portion of the guideway 16 along which the slot 20 extends and comprises a flat plate 24 disposed against the outer side of the guideway, rivets 25 and 26 extending through the plate 24 at locations spaced apart longitudinally of the plate and disposed medially of the width thereof and through the slot 20, these rivets having enlarged heads disposed at the inner side of the web portion of the member 16 to secure the plate 24 to the guideway member while providing freedom of sliding movement of the slide longitudinally of the member 16 for the extent of the slot 20. A head plate 27 is secured to the end of the plate 24 remote from the platform structure 11 of the cart frame and extends perpendicular to the plate 24 in a direction away from the outer surface of the guideway 16. The head plate 27 is provided with apertures 28 and 29 spaced apart longitudinally thereof and a lug 30 is secured at one end to the plate 27 medially of the length of the side of this plate remote from the slide plate 24 and is provided with an aperture 31. A second slide 34 in the form of a flat plate of substantially triangular shape is disposed against the side of the guideway 16 along which the slot 21 extends and rivets 35 and 36 extend through apertures 37 and 38 spaced apart longitudinally of the plate 34 and disposed medially of the width thereof and through the slot 21, being provided at the inner side of the guideway structure 16 with enlarged heads which bear against the inner surface of the web portion of the guideway and secure the slide 34 to the guideway for movement longitudinally of the guideway to the extent of the slot 21. Apertured brackets 39 and 40 are pivotally connected to the plate 34 one at each corner of this plate adjacent the platform structure 11 of the cart frame and extend beyond the lower edge of the plate. An elongated link 42 is connected at one end to the rivet 35 of the slide 34 and is connected at its other end to the rivet 26 of the slide 22 to connect the slides 22 and 34 together for simultaneous and coextensive movement along the slots 20 and 21 of the guideway 16.

At a location near the end of the frame plate 10 from which the platform structure 11 extends the guideway 16 is provided with a discontinuity, as indicated at 44 in Figure 15, and a bearing structure, generally indicated at 45, is disposed in the discontinuity 44 and secured to the frame plate 10.

The bearing structure 45 comprises a member of channel-shaped cross section having its web disposed against the adjacent surface of the frame plate 10 and secured thereto by suitable means, such as rivets, and its open side disposed at the side thereof remote from the frame plate. This member is disposed perpendicular to the frame plate 10 and extends substantially equal distances to respectively opposite sides of the frame plate. A tube 46 extends through the channel member 45 and outwardly of the end of this channel member and the lower flange 47 of the channel member has separated end portions 48 and 49 wrapped about the tube 46 to rigidly secure the tube in the channel member and provide a bearing for the cart axles presently to be described.

The cart has two crank-shaped axles 50 and 51 of which the axle 50 has one leg slidably and rotatably received in the bearing tube 46 and projecting from one end of this bearing tube and a second leg extending perpendicularly from the end of the first leg projecting from the bearing tube. At the end of the second leg remote from the first leg the second leg is perpendicularly offset to provide a journal portion 52 and a wheel 53 is journaled on the journal portion 52 of the axle 50. The axle 51 is of the same shape as the axle 50 and has one leg slidably and rotatably received in the tube 46 and projecting at one end from the end of the tube 46 remote from the axle 50 and has a second leg extending perpendicularly from the end of the first leg projecting from the corresponding end of the tube, and a journal portion 54 extending perpendicularly from the end of the second leg remote from the first leg. A wheel 55 is journaled on the journal portion 54 of the axle 51 and is disposed in spaced and parallel relationship to the wheel 53, the wheels 53 and 55 having a common axis of rotation which is parallel to the axis of the bearing sleeve 46 and is movable toward and away from the frame plate 10 of the cart.

A collar 57 is mounted on the axle 50 adjacent the end of the axle leg projecting from the tube 46 and is provided with an outwardly projecting, apertured lug formation. A link 58 is pivotally connected at one end to the lug formation of the collar 57 and is secured at its other end in one of the apertures of the bracket 39 pivotally mounted on the slide 34. A second collar 60 is mounted on the journal portion 52 of the axle 50 and provided with a laterally projecting, apertured lug formation and a link 61 is pivotally connected at one end to the lug formation of the collar 60 and extends at its other end through the aperture 28 in the head plate portion 27 of the slide 22. The link 61 is provided on its end projecting through the head plate portion 27 with a head or nut 62 which will not pass through the aperture 28 and is provided at a location spaced from the nut 62 with a screw threaded portion 63 carrying a spring abutment washer 64 secured in position longitudinally of the link 61 by mutually locking nuts 65 threaded onto the screw threaded portion 63 of the link. A compression spring 66 surrounds the link 61 between the abutment washer 64 and the adjacent or undersurface of the head plate portion 27 of the slide 22.

A collar 68 is mounted on the axle 51 near the end of the leg of this axle projecting from the tube 46 and is provided with a laterally extending, apertured lug formation. A link 69 is pivotally connected at one end to the lug formation of the collar 68 and is secured at its other end to the bracket 40 carried by the slide 34. A collar 70 is mounted on the journal portion 54 of the axle 51 and provided with a laterally extending, apertured lug formation and a link 71, corresponding to the link 61, is pivotally connected at one end to the lug formation of the collar 70 and extends at its other end through the aperture 29 in the head plate portion 27 of the slide 22. The link 71 is provided on its end extending through the head plate portion 27 with a head or nut 72 which will not pass through the aperture 29 and is provided at a location spaced from the head or nut 72 with a screw threaded portion 73. A spring abutment washer 74 is mounted on the link 71 and held in position spaced from the head 72 by mutually locking nuts 75 threaded onto the screw threaded portion 73 of the link. A coiled compression spring 76 surrounds the link 71 between the abutment washer 74 and the adjacent or underside of the head plate portion 27 of the slide 22.

With this arrangement, when the slides 22 and 34 are moved to their limiting position adjacent the bearing structure 45, the longitudinal center lines of both of the axles 50 and 51 are disposed substantially in a plane perpendicular to the longitudinal center line of the frame plate 10 and the wheels 53 and 55 are spaced rearwardly of the frame plate with their common rotational axis substantially parallel to the axis of the bearing tube 46. This is the unfolded or operative condition of the cart, as illustrated in Figure 2, and the links 58 and 69 have their center lines substantially parallel to the longitudinal center line or axis of the bearing tube 46 while the links 61 and 71 incline upwardly and inwardly from the journal portions of the corresponding axles to the slide 22. The wheels are spaced substantially equal distances from the respectively opposite sides of the frame plate and the frame plate is resiliently supported on the wheels by the coiled compression springs 66 and 76 which provide a spring suspension for the cart frame.

A pair of lug plates 78 and 79 are secured to the frame plate 10 near the end of the frame plate remote from the platform structure 11 and project outwardly from the rear side of the frame plate in spaced apart and substantially parallel relationship to each other, and a tubular handle 80 has one end thereof disposed between the lug plates 78 and 79. The lug plates are provided with mutually registering slots, of which the slot in the lug plate 78 is illustrated in Figure 1 and Figure 4 and designated at 81, these slots being closed and disposed substantially parallel to the frame plate 10 and having offset portions at their upper and lower ends. A pivot pin 82 extends through the lug plate slots and diametrically through the handle 80 pivotally connecting the handle to the lug plates and, through the lug plates, to the frame of the cart. A link 84 is pivotally connected at one end to the end of the handle 80 nearest the pivot pin 82 and is pivotally connected at its other end to the lug or ear 30 of the slide 22, for moving the slides 22 and 34 longitudinally of the guideway 16 when the handle is swung about the axis of the pivot pin 82.

A stop pin 84 extends through the lug plates 78 and 79 near the outer, upper corners of these lug plates and engages the handle 80 when the cart is unfolded, as illustrated in Figure 1, to hold the handle in operative position for propelling the cart. An angle bracket 85 is pivotally mounted on the lug plate 78 and has an eye formation 86 spaced from the outer side of this lug plate. A locking pin 87 extends through the eye formation 86 and through registering apertures in the lug plates 78 and 79 and a coiled compression spring 88 surrounds this pin between the eye formation 86 and a spring abutment 89 secured on the pin adjacent the lug plate 78 so that the pin can be pulled outwardly of the lug plates by a hand knob 90 on the outer end of the pin and will be resiliently urged inwardly of the plates by the spring 88.

When the cart is in its unfolded condition, as illustrated in Figure 1, the pin 87 extends through the registering apertures in the lug plates 78 and 79 and through a diametrical aperture in the handle 80 to securely lock the handle in its operative position relative to the cart frame. When it is desired to fold the cart the pin 87 is withdrawn from the handle and the bracket 85 is pivoted about its pivotal connection with the lug plate 78 to move the pin out of registry with the apertures in the lug plates. The handle is then swung downwardly about the pivot pin 82 pulling the slides 22 and 34 toward the end of the frame plate 10 remote from the platform structure 11. This movement of the slides pulls on the links 61 and 71 and on the links 58 and 69, causing the axles 50 and 51 to move inwardly of the bearing tube 46 and to also turn so that, as the wheels 53 and 55 are moved toward each other by the increasing angularity of the links 58 and 59, the rotational axis of the wheels is moved toward the frame plate 10 by the turning movement imparted to the crank-shaped axles by the links 61 and 71. When the slides have been moved to the maximum extent possible with the pivot pin 82 disposed in the lower ends of the slots in the lug plates, the outer end of the handle is raised to move the pivot pin 82 to the upper end of the corresponding slots and into the offset upper end portion of these slots whereupon a further downward movement of the handle will complete the movement of the slides longitudinally of the frame plate to their limiting position away from the platform structure 11. The wheels are then disposed close to the adjacent sides of the frame plate 10 and the axles are disposed substantially along the sides of this frame plate. The handle is now locked in cart-folding position by swinging the bracket 85 until the pin 87 is in alignment with the lower ends of the slots 81 and then permitting the spring 88 to move the pin through the lower ends of the slots and through an aperture in the handle 80, as is illustrated in Figure 4.

When it is desired to unfold the folded cart the handle is raised from its position illustrated in Figure 4 to the position illustrated in Figure 1, the pin 87 first being withdrawn and the bracket 85 pivoted to move the pin out of registry with the lower ends of the slots in the lug plates. The pin 82 will remain in the upper ends of the slots in the lug plates until the handle engages the stop pin 84 whereupon the pin 82 will be forced from the upper ends to the lower ends of the lug plate slots to the final position illustrated in Figure 1. The bracket 85 is then further pivoted and the pin 87 inserted through the apertures in the lug plates and in the handle to lock the handle in its cart-propelling position.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A foldable golf bag cart comprising an elongated frame plate having a platform structure at one end and strap hangers projecting laterally therefrom near the respectively opposite ends thereof, a bearing structure secured to and extending transversely of said plate adjacent said platform structure, a guideway mounted on and extending longitudinally of said frame plate between said platform structure and the end of said plate remote from said platform structure, slides carried by said guideway at spaced apart locations therealong, crank-shaped axles disposed one at each end of said bearing structure and each having one leg slidably and rotatably mounted in said bearing structure and a second leg extending perpendicularly from the end of said one leg disposed outwardly of said bearing structure, wheels journaled on said axles at the outer ends thereof for rotation about a common axis parallel to the axis of said bearing structure, links connecting said slides to said axles for movement of said axles inwardly of said bearing structure and rotationally in said bearing structure to move said wheels toward each other and bring the rotational axis of said wheels adjacent said frame plate when said slides are moved along said guideway in a direction away from said platform, a lug structure mounted on and projecting outwardly of said frame plate near the end of the latter remote from said platform structure, a cart handle pivotally mounted near one end thereof on said lug structure, link means connecting said one end of said handle to said slides for moving said slides toward and away from said platform structure upon swinging movement of said handle about its pivotal connection with said lug structure, and stop means carried by said lug structure and engaging the handle for holding the latter in operative position for propelling the cart.

2. A foldable golf bag cart comprising a frame including an elongated guideway and a platform adjacent one end of the guideway, a tubular bearing structure mounted on said frame adjacent said platform with its axis substantially perpendicular to the longitudinal center line of the frame, crank-shaped axles disposed at respectively opposite sides of said frame and each having a first leg slidably and rotatably received in said bearing structure and a second leg extending at an angle from said first leg, wheels journaled one on each of said axles at the outer ends of the axles, at least one slide mounted on said guideway, links connecting each of said axles to said slide for movement of said axles inwardly of said bearing structure and of said wheels toward said frame when said slide is moved along said guideway in a direction away from said platform structure, a handle pivotally connected to said frame near the end of said frame remote from said platform and connected to said slide for moving the latter along said guideway, said links being longitudinally movable relative to said slide, and springs compressively disposed between said links and said slide resiliently supporting said frame on said wheels for independent resiliently resisted movement of said wheels relative to said frame.

3. A foldable golf bag cart comprising a frame including an elongated guideway and a platform adjacent one end of the guideway, a tubular bearing structure mounted on said frame adjacent said platform with its axis substantially perpendicular to the longitudinal center line of the frame, crank-shaped axles disposed at respectively opposite sides of said frame and each having a first leg slidably and rotatably received in said bearing structure and a second leg extending at an angle from said first leg, wheels journaled one on each of said axles at the outer ends of the axles, at least one slide mounted on said guideway, links connecting each of said axles to said slide for movement of said axles inwardly of said bearing structure and of said wheels toward said frame when said slide is moved along said guideway in a direction away from said platform structure, a handle pivotally connected to said frame near the end of said frame remote from said platform and connected to said slide for moving the latter along said guideway, springs compressively disposed between said links and said slide resiliently supporting said frame on said wheels for independent resiliently resisted movement of said wheels relative to said frame, stop means carried by said frame engaging said handle to position said handle for propelling said cart when the latter is unfolded, and manually operated means carried by said frame and engageable with said handle to releasably lock the handle in either its cart-folding or cart-unfolding position.

References Cited in the file of this patent

UNITED STATES PATENTS

| Number | Name | Date |
|---|---|---|
| 2,572,408 | Vanden Hoek | Oct. 23, 1951 |
| 2,626,815 | Chamberlin | Jan. 27, 1953 |